(No Model.)
C. H. WARREN.
NUT LOCK.
No. 405,632. Patented June 18, 1889.
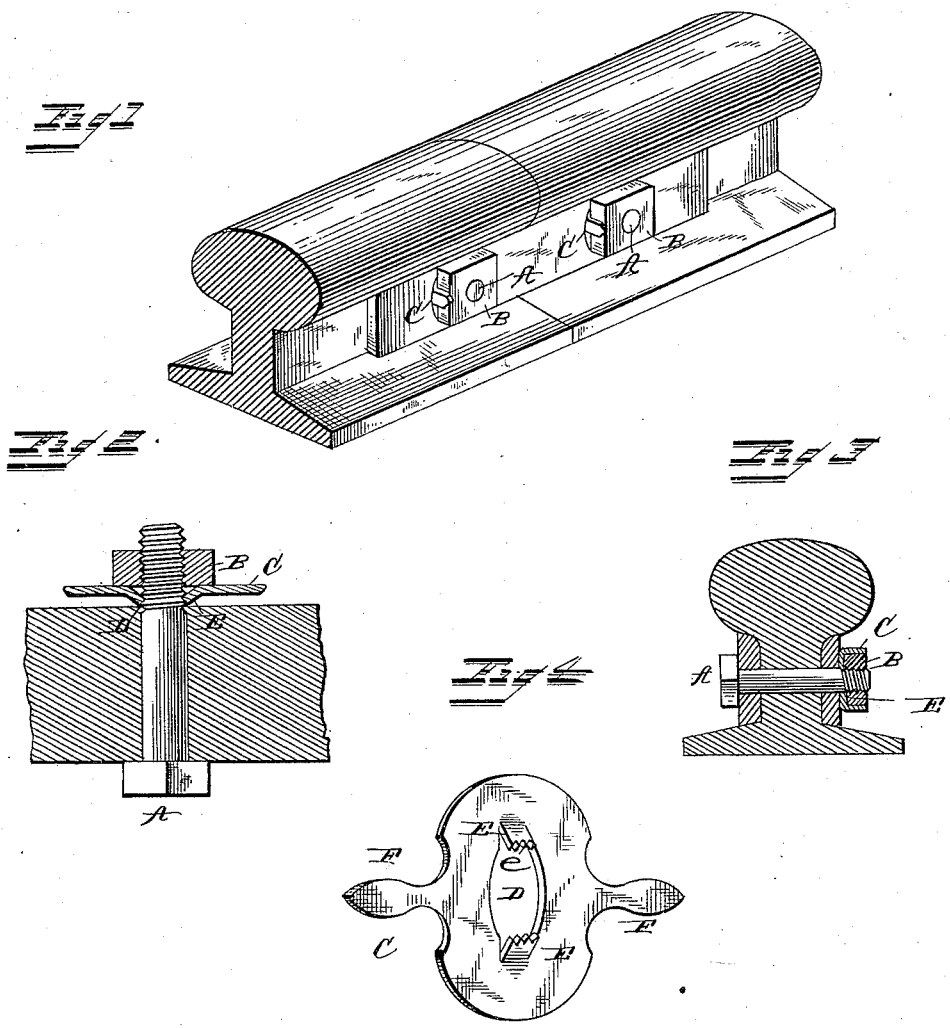
WITNESSES
F. L. Ourand
R. W. Elliott
INVENTOR
Charles H. Warren,
by J. Louis Bagger & Co.
Attorneys

UNITED STATES PATENT OFFICE.

CHARLES H. WARREN, OF PETERBOROUGH, NEW HAMPSHIRE.

NUT-LOCK.

SPECIFICATION forming part of Letters Patent No. 405,632, dated June 18, 1889.

Application filed June 23, 1888. Serial No. 277,955. (No model.)

*To all whom it may concern:*

Be it known that I, CHARLES H. WARREN, a citizen of the United States, and a resident of Peterborough, in the county of Hillsborough and State of New Hampshire, have invented certain new and useful Improvements in Nut-Locks; and I do hereby declare that the following is a full, clear, and exact description of the invention, which will enable others skilled in the art to which it appertains to make and use the same.

This invention relates to nut-locks.

The object is to produce a nut-lock which shall be of such construction that the nut will at all times be held firmly in position on the bolt against any loosening or falling off from the vibration incident to the passage of trains over the track or jar from any machinery on which it may be used; furthermore, to produce a nut-lock which shall be simple of construction, efficient and durable in use, and comparatively inexpensive of production.

In the accompanying drawings, forming part of this specification, and in which like letters of reference indicate corresponding parts, Figure 1 is a perspective view of a bolt and nut in position on a rail-joint and provided with my new and improved nut-lock. Fig. 2 is a vertical sectional view of a bolt, with the nut and locking device in position thereon, before being screwed home. Fig. 3 is a vertical sectional view of a rail-joint, showing the nut screwed home, the tongues on the washer engaging the threads of the bolt, and the sides of the same turned up against the nut to prevent its turning. Fig. 4 is a detail view of the washer, showing its peculiar construction.

Referring to the drawings, A designates the bolt, which is of the ordinary construction, and is to be inserted through the rail, bar, plate, or other object in which it is to be applied.

B designates the nut to be screwed on the threaded end of the bolt, and is also of the ordinary construction and of any desired size and shape.

C designates the washer or locking-plate, which forms the nut-lock proper, this plate being made of steel or iron, so as to have the requisite strength and spring. In the center of this plate is formed an opening D, preferably of the same diameter as the bolt on which it is to be used, the sides of which are stamped out to form the tongues E, which, when the nut is screwed home, engage the threads on the bolt and hold it firmly in position. These tongues extend out beyond the edges of the central opening D, and only two are shown in this instance; but it is obvious that the number may be increased, if desired. The outer edges of the washer are formed into the tongues F, designed to be bent up around the nut when the same is seated, to hold it in position on the bolt, as shown in Fig. 3.

In operation, the washer is first placed on the bolt, the tongues E resting on the plate or bar, through which the bolt has been inserted, and pointing toward the threads of the same. It will be observed that the inner edges of these tongues are provided with a number of serrations or teeth e, and that they conform to the shape of the bolt and rest in the threads. The nut is then screwed home and the pressure of the same on the washer E causes the tongues to be forced against the bolt and between the threads of the same, so that when the nut is turned down as far as possible the tongues e are wedged in between the threads of the bolt and threads of the nut and bear with great pressure against the threads of the bolt, causing its teeth to become embedded therein. The tongues F are then turned up against the faces of the nut, thereby securing it in place.

It will thus be seen from the foregoing description, taken in connection with the drawings, that, the washer or locking-plate having been placed on the bolt and the nut screwed home, the tongues of the washer will be forced and wedged in so effectually and completely between the thread of the nut and thread of the bolt as to prevent the washer from turning on the bolt. The outward-extending tongues F of the washer are then bent up against the sides or faces of the nut, so that, while the washer is held firmly clasping the bolt and cannot turn upon the same, the nut cannot turn relative to the washer, and thus a simple and effective nut-lock is produced.

Having thus fully described my invention, what I claim as new, and desire to secure by Letters Patent, is—

A nut-lock consisting of a washer having portions of the metal surrounding the bolt-opening struck up to form opposed inward-projecting serrated tongues for engaging the threads of the bolt, and having its periphery provided with outward-projecting flexible arms adapted to be turned into engagement with the outer edges of the nut and to extend across the same, substantially as specified.

In testimony that I claim the foregoing as my own I have hereunto affixed my signature in presence of two witnesses.

CHARLES H. WARREN.

Witnesses:
JAMES F. BRENNAN,
ELLEN F. BRENNAN.